(12) United States Patent
Diepold

(10) Patent No.: US 9,278,396 B2
(45) Date of Patent: Mar. 8, 2016

(54) DOUBLE-SIDED CUTTING INSERT FOR MILLING

(75) Inventor: Anton Diepold, Grainau (DE)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 164 days.

(21) Appl. No.: 14/240,458

(22) PCT Filed: Aug. 23, 2012

(86) PCT No.: PCT/AT2012/000220
§ 371 (c)(1),
(2), (4) Date: Feb. 24, 2014

(87) PCT Pub. No.: WO2013/029072
PCT Pub. Date: Mar. 7, 2013

(65) Prior Publication Data
US 2014/0212229 A1  Jul. 31, 2014

(30) Foreign Application Priority Data

Aug. 26, 2011 (AT) ................. GM469/2011

(51) Int. Cl.
*B23C 5/00* (2006.01)
*B23C 5/20* (2006.01)
*B23C 5/02* (2006.01)

(52) U.S. Cl.
CPC ............... *B23C 5/207* (2013.01); *B23C 5/202* (2013.01); *B23C 5/205* (2013.01); *B23C 2200/0455* (2013.01); *B23C 2200/085* (2013.01); *B23C 2200/125* (2013.01); *B23C 2200/203* (2013.01);

(Continued)

(58) Field of Classification Search
CPC ........ B23C 5/109; B23C 5/202; B23C 5/205; B23C 220/081; B23C 220/123; B23C 220/12; B23C 220/206; B23C 220/20
See application file for complete search history.

(56) References Cited

U.S. PATENT DOCUMENTS 5,145,295 A * 9/1992 Satran .................. B23C 5/2213
407/113
5,158,402 A * 10/1992 Satran .................... B23C 5/202
407/113

(Continued)

FOREIGN PATENT DOCUMENTS

CN   101077540 A   11/2007
CN   101096057 A   1/2008

(Continued)

*Primary Examiner* — Will Fridie, Jr.
(74) *Attorney, Agent, or Firm* — Laurence A. Greenberg; Werner H. Stemer; Ralph E. Locher

(57) ABSTRACT

A double-sided cutting insert for milling, in particular for face milling, includes first and second cutting edges each having alternately disposed main lips and secondary lips which each extend between active and passive cutting corners. Each main lip, starting from a first distance from a reference plane at an active cutting corner, extends in a manner dropping monotonously to a smaller, second distance from the reference plane at a passive cutting corner. That end of a secondary lip that adjoins the active cutting corner is in each case at a greater distance from the reference plane than the other end of the secondary lip that is remote from the active cutting corner. A circumferential side surface has, immediately adjacent the secondary lips, in each case planar secondary flanks and each secondary lip is formed at least regionally in a convex manner in plan view of the associated secondary flank.

12 Claims, 5 Drawing Sheets

(52) U.S. Cl.
  CPC ..... *B23C 2200/208* (2013.01); *B23C 2200/286* (2013.01); *Y10T 407/1924* (2015.01); *Y10T 407/23* (2015.01); *Y10T 407/235* (2015.01)

(56) References Cited

U.S. PATENT DOCUMENTS

| | | | |
|---|---|---|---|
| 5,382,118 A * | 1/1995 | Satran | B23C 5/06 407/113 |
| 5,951,214 A * | 9/1999 | Rothballer | B23C 5/2213 407/113 |
| 7,104,735 B2 | 9/2006 | Johnson et al. | |
| 7,410,332 B2 | 8/2008 | Scherbarth | |
| 7,547,164 B2 | 6/2009 | Hessman | |
| 8,485,764 B2 | 7/2013 | Xu | |
| 8,491,234 B2 * | 7/2013 | Fang | B23C 5/109 407/113 |
| 2007/0003384 A1 | 1/2007 | Smilovici et al. | |
| 2010/0034602 A1 | 2/2010 | Sung et al. | |
| 2010/0150671 A1 | 6/2010 | Oprasic et al. | |
| 2010/0202839 A1 | 8/2010 | Fang et al. | |
| 2011/0305532 A1 | 12/2011 | Harif | |
| 2012/0093596 A1 | 4/2012 | Ishi | |
| 2012/0155976 A1 | 6/2012 | Ishi | |
| 2013/0094913 A1 | 4/2013 | Yoshida | |
| 2013/0115022 A1 * | 5/2013 | Ishi | B23C 5/109 409/132 |
| 2013/0129430 A1 | 5/2013 | Bhagath et al. | |

FOREIGN PATENT DOCUMENTS

| | | |
|---|---|---|
| CN | 101594959 A | 12/2009 |
| JP | 2008544872 A | 12/2008 |
| JP | 2010142948 A | 7/2010 |
| RU | 2125929 C1 | 2/1999 |
| RU | 2007107709 A | 10/2008 |
| RU | 2477674 C1 | 3/2013 |
| WO | 2008078892 A1 | 7/2008 |
| WO | 2010093120 A2 | 8/2010 |
| WO | 2010097797 A1 | 9/2010 |
| WO | 2011001939 A1 | 1/2011 |
| WO | 2011052340 A1 | 5/2011 |
| WO | 2011092883 A1 | 8/2011 |
| WO | 2011138950 A1 | 11/2011 |
| WO | 2012020784 A1 | 2/2012 |
| WO | 2012043579 A1 | 4/2012 |

* cited by examiner

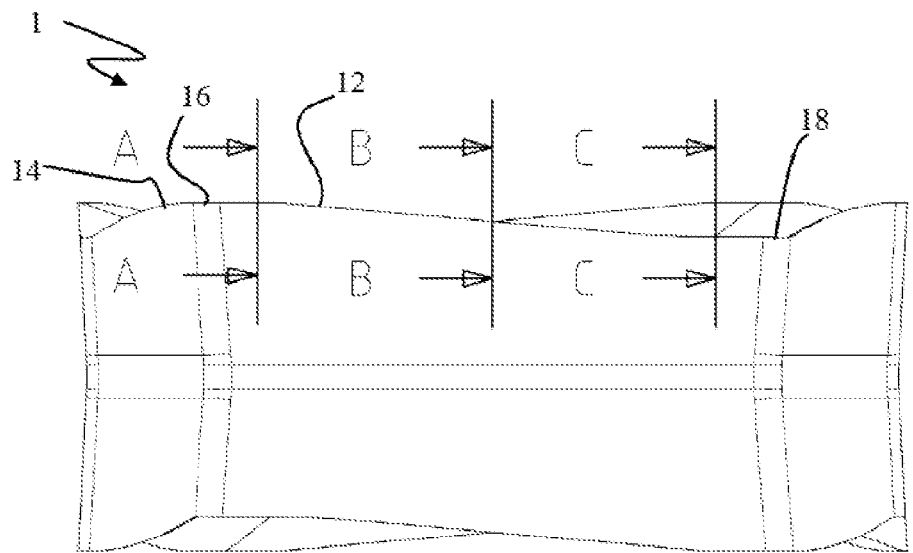
FIG. 7
SECTION A-A 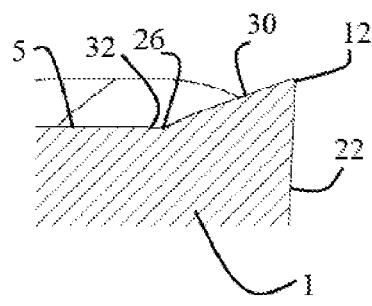
SECTION B-B 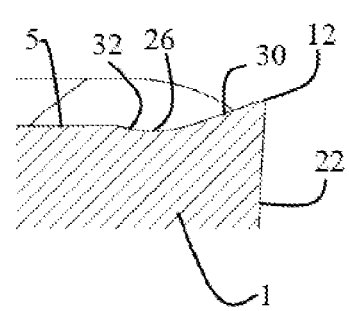
SECTION C-C 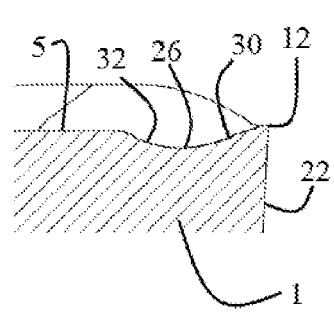
FIG. 8A  FIG. 8B  FIG. 8C

DOUBLE-SIDED CUTTING INSERT FOR MILLING

BACKGROUND OF THE INVENTION

Field of the Invention

The present invention relates to a double-sided cutting insert for milling and to a milling tool having at least one such cutting insert.

In order to machine in particular metal work pieces, use is frequently made of milling tools which have a carrier body which is provided with a cutting insert or a plurality of cutting inserts. In this case, the cutting inserts are usually exchangeable and represent disposable articles which have to be exchanged at more or less regular intervals on account of wear. It is known to configure the cutting inserts as what are known as indexable cutting inserts which have a plurality of identically configured cutting edge portions, wherein individual cutting edge portions can be brought successively into an active position, in which said cutting edge portions carry out machining of the workpiece to be machined, by changing the relative orientation of the cutting insert with respect to the carrier body of the milling tool. The respectively inactive cutting edge portions do not in this case come into contact with the workpiece and can be moved into the active position for example after the previously active cutting edge portion becomes worn. In this way, a plurality of cutting edge portions which are available independently of one another are provided, allowing efficient utilization of the cutting insert.

In order to achieve utilization of the cutting insert which is as efficient as possible, it is known to use double-sided cutting inserts which are each provided with a cutting edge both at the transition between a top side and a circumferential side surface and at a transition between an underside and the circumferential side surface, said cutting edge having a plurality of cutting edge portions which can be used independently of one another.

In particular for face milling, use is frequently made of indexable cutting inserts of what is known as the S type (square), which have a square basic form having four cutting edges, which extend substantially along the sides of a square, per cutting edge. In this case, adjoining secondary lips, or facing lips, are arranged between adjacent main lips—via what are known as active and passive cutting corners—it being possible for said secondary lips, or facing lips, to extend for example typically at an angle of about 135° in relation to the main lips. In an installed state of the cutting insert in a milling tool, a secondary lip is in this case usually arranged in a manner substantially perpendicular to a rotation axis of the milling tool and serves as a facing lip that smooths the surface. The main lip, which adjoins the secondary lip radially on the outside, with respect to the milling tool, via an active cutting edge, serves as a primarily machining lip.

In order to avoid the rear cutting edge, with respect to the rotation, of the double-sided cutting insert wearing down or being damaged during operation, the cutting insert has to be arranged in an inclined manner in the milling tool such that the latter is both tilted forward in the axial direction, in order to protect the secondary lip, located behind the secondary lip that engages in the workpiece, of the cutting edge, and tilted in the radial direction, in order to protect the main lip, located behind the main lip that engages in the workpiece, of the other cutting edge. Strong tipping in the axial and/or radial direction can lead to problems both with respect to the active cutting forces and with respect to chip formation.

It should be noted that in the present technical field, certain terms such as clearance angle, rake angle, etc., for example, can be defined on the one hand "nominally" with respect to the cutting insert and can be defined on the other hand also (in a divergent manner) "effectively" with respect to the installation situation of the cutting insert on a milling tool in relation to the workpiece. In the following description, these terms are used primarily "nominally" without corresponding additional information being expressly given in each case.

It is desirable to achieve a field of application which is as broad as possible with a cutting insert, in particular to allow an application with different feed rates, chip widths and/or chip depths.

WO 2010/093120 A2 describes a milling tool having a double-sided cutting insert. A main lip has, starting from a cutting corner, initially a falling profile and then passes to a rising profile again.

It is the object of the present invention to provide a cutting insert which both allows efficient utilization of the cutting edges provided and results during operation in high quality of the machined workpiece surface.

BRIEF SUMMARY OF THE INVENTION

The object is achieved by a double-sided cutting insert for milling as described below.

The double-sided cutting insert for milling may be configured in particular for face milling and has: a top side; an underside; a circumferential side surface; a first cutting edge which is formed at a transition from the top side to the circumferential side surface; a second cutting edge which is formed at a transition from the underside to the circumferential side surface; an axis of symmetry with respect to which the cutting insert has n-fold rotational symmetry; and a reference plane which extends perpendicularly to the axis of symmetry and divides the cutting insert into two halves. The first cutting edge and the second cutting edge each have alternately arranged main lips and secondary lips which each extend between active and passive cutting corners. Each main lip, starting from a first distance from the reference plane at an active cutting corner, extends in a manner dropping monotonously to a smaller, second distance from the reference plane at a passive cutting corner. That end of a secondary lip that adjoins the active cutting corner is in each case at a greater distance from the reference plane than that other end of the secondary lip that is remote from the active cutting corner. The circumferential side surface has, immediately adjacent to the secondary lips, in each case planar secondary flanks. Each secondary lip is formed at least regionally in a convex manner in plan view of the associated secondary flank.

Thus, starting from an active cutting corner which is arranged, during operation, between a main lip that engages in the material to be machined and a secondary lip that engages in the material to be machined, the respective main lips extend in a monotonously dropping manner as far as the passive cutting corner, i.e. over its entire profile, the main lip becomes closer to the reference plane or at most regionally extends parallel to the latter. As a result of this configuration, the cutting insert can be arranged in such a manner in a milling tool that the main lip has a positive effective axial angle along its entire length and the entire length of the main lip can be used for a smooth and efficient machining process. Thus, the configuration of the main lip allows a broad field of application of the cutting insert.

Since that end of a secondary lip that adjoins the active cutting corner is in each case at a greater distance from the reference plane than the other end of the secondary lip that is remote from the active cutting corner, the secondary lip can in this case adjoin in each case adjacent main lips via an active cutting corner and a passive cutting corner. Thus, the entire length of the secondary lip can also be used efficiently as a facing lip. For example, the secondary lip can be at the same first distance from the reference plane at the active cutting corner as the main lip which is likewise adjacent thereto, and the secondary lip can be at the same second distance from the reference plane at the passive cutting corner as the other main lip which is likewise adjacent thereto. However, it is for example also possible for that side of the active cutting corner that adjoins the main lip to be at a distance from the reference plane which is slightly different from the distance on the side adjoining the secondary lip. Similarly, that side of the passive cutting corner that adjoins the main lip can be at a distance from the reference plane which is slightly different from the distance on the side adjoining the secondary lip. In these cases, the cutting corner itself does not extend parallel to the reference plane.

Since the respective secondary lip is formed at least regionally in a convex manner in plan view of the associated secondary flank, much better quality—compared with a configuration in which the secondary lip extends for example in a straight line—of the surface smoothed with the secondary lip can be achieved on the machined workpiece. In particular, a rake surface is achieved which has no relatively sharp grooves brought about by the active cutting edge.

Through the combination of these features, great variability in the operation of the cutting insert and excellent surface quality are thus achieved at the same time. The first cutting edge and the second cutting edge can in this case be configured for example in a relatively sharp manner at the transition between the circumferential side surface and the top side or the underside. However, it is for example also possible to provide the cutting edges around the entire circumference or regionally with a bevel, for example in order to stabilize the cutting edge.

According to one configuration, the secondary flanks become closer to the axis of symmetry with increasing distance from the associated secondary lip. In this way, the secondary flanks can extend for example approximately as far as a reference plane which divides the cutting insert into two halves. On account of the configuration of the secondary flanks, positive nominal secondary clearance angles are thus provided on both sides of the cutting insert in the region of the secondary lips. In this way, the cutting insert can be arranged in a milling tool with a smaller degree of tipping in the axial direction, since wear that occurs in the region of the secondary flank is reduced by this configuration. Furthermore, in this way, a greater degree of design freedom for the configuration of a chip geometry in or on the top side and the underside of the cutting insert is achieved. Improved cutting behavior is also achieved with the smaller degree of tipping.

According to one configuration, the circumferential side surface has, immediately adjacent to the main lips, in each case main flanks and the main flanks become closer to the axis of symmetry with increasing distance from the associated main lip. In this way, the main flanks can extend for example approximately as far as the reference plane. On account of the configuration of the main flanks, positive nominal main clearance angles can thus be provided on both sides of the cutting insert in the region of the main lips. As a result, the cutting insert can be arranged in a milling tool with a smaller degree of tipping in the radial direction, since with such an installation, too, reduced wear of the main flanks is achieved. Thus, in the region of the main lips, too, a higher degree of design freedom can be achieved with respect to chip geometries in or on the top side and underside of the cutting insert, and improved cutting behavior can be achieved.

According to one configuration, the top side and the underside are provided, in each case adjacent to the secondary lips, with secondary rake faces which extend in a convexly curved manner into a chip base. As a result of this curved configuration of the secondary rake faces into the chip base, good chip guidance, in particular more targeted chip control, is achieved in particular at shallow cutting depths.

According to one configuration, the circumferential side surface is divided by a circumferential constriction into an upper partial side surface and a lower partial side surface. In this case, both the secondary flanks and the main flanks can be configured, in a structurally simple manner, with nominal positive clearance angles with respect to both cutting edges of the cutting insert. The constriction can in this case extend for example in particular parallel to or in the reference plane. Preferably, the constriction extends in this case in the reference plane such that it extends in one plane and in particular not obliquely with respect to the reference plane. In this case, improved and simplified clampability of the cutting insert in a milling tool is enabled.

According to one configuration, the top side and the underside are provided, adjacent to the cutting edges, with rake faces which become closer to the reference plane with increasing distance from the respective cutting edge and lead into a chip base which is adjoined by a chip back which becomes more remote from the reference plane with increasing distance from the cutting edge, and the height of the chip back increases along the respective main lip from the active cutting corner in the direction of the passive cutting corner. The height of the chip back is determined in this case in a direction perpendicular to the reference plane starting from the respective chip base as far as the highest point of the chip back. With this configuration, optimized chip formation is achieved in particular at deep cutting depths.

Preferably, the top side and the underside are each provided with a chip-guiding structure which has a rake face, a chip base and a chip back, and a radius of the chip-guiding structure increases along the main lip from the active cutting corner in the direction of the passive cutting corner. As a result of this configuration, in particular in combination with an increasing height of the chip back, improved chip formation is achieved at deep cutting depths, since in this direction, the height of the main lip (relative to the reference plane) also decreases.

According to one configuration, the first cutting edge and the second cutting edge are each provided with four main lips and four secondary lips, wherein adjacent main lips are each arranged substantially at right angles to one another and the secondary lips each extend at an obtuse angle to adjacent main lips. In this case, four cutting edge portions which can be used independently of one another are provided per cutting edge, such that the cutting insert is configured so as to be indexable in a total of eight ways. In this case, the secondary lips can extend in particular at an angle of approximately 135° to the adjacent main lips.

According to one configuration, active cutting corners of the first cutting edge are each formed opposite passive cutting corners of the second cutting edge with respect to the reference plane and passive cutting corners of the first cutting edge are each formed opposite active cutting corners of the second cutting edge with respect to the reference plane. Thus, the main lips and secondary lips of the first cutting edge and the second cutting edge can be used identically. The main lips and the secondary lips of the first cutting edge can extend substantially along the same contour as the main lips and the secondary lips of the second cutting edge, in plan view along the axis of symmetry.

Preferably, the length of the secondary lips is between ⅙ and ½ of the length of the main lips. In this case, the cutting insert can be configured in a particularly advantageous manner in the basic shape of what is known as an S insert, which has proven successful in particular for face milling.

The object is also achieved by a milling tool having at least one above-described cutting insert, in which the cutting insert is fastened to the milling tool in such a way that a secondary lip is oriented in a manner substantially perpendicular to a rotation axis of the milling tool.

BRIEF DESCRIPTION OF THE SEVERAL VIEWS OF THE DRAWING

Further advantages and expedient aspects of the invention can be gathered from the following description of exemplary embodiments with reference to the appended figures, in which:

FIG. 7: shows a side view corresponding to FIG. 3 in order to explain the section directions in FIGS. 8a to 8c;

FIG. 8a: shows a section in the direction A-A in FIG. 7;

FIG. 8b: shows a section in the direction B-B in FIG. 7;

FIG. 8c: shows a section in the direction C-C in FIG. 7;

FIG. 9b: shows an enlarged illustration of the detail X from FIG. 9a.

DESCRIPTION OF THE INVENTION

An embodiment is described in the following text with reference to the figures. First of all the basic shape of the double-sided cutting insert for milling -1- is described with reference to FIG. 1 to FIG. 4.

The double-sided cutting insert -1- is configured in particular for face milling. The cutting insert -1- has a top side -2-, an underside -4- and a circumferential side surface -6-. A first cutting edge -8- is formed at the transition between the top side -2- and the side surface -6-. A second cutting edge -10- formed identically to the first cutting edge -8- is formed at the transition between the underside -4- and the side surface -6-. The first cutting edge -8- is formed in a circumferential manner around the top side -2- and the second cutting edge -10- is formed in a circumferential manner around the underside -4-.

An axis of symmetry -S- is provided, about which the cutting insert -1- has 4-fold rotational symmetry. An (imaginary) reference plane -R- that extends perpendicularly to the axis of symmetry -S- divides the cutting insert -1- into a top half and a bottom half which are formed in an identical manner. A bore -3- that extends concentrically with the axis of symmetry -S- is provided and passes through the cutting insert -1- from the top side -2- to the underside -4- and serves to receive a fastening screw for fastening the cutting insert -1- to a milling tool. A planar surface -5- is provided in a manner encircling the bore -3- both on the top side -2- and on the underside -4-, said planar surface -5- extending parallel to the reference plane -R- and serving as a support surface when the cutting insert -1- is fastened to a milling tool.

The first cutting edge -8- and the second cutting edge -10- each have four identically configured cutting edge portions which can be used independently of one another. The cutting edge portions each have in this case a main lip -12- and a secondary lip -14- which are connected together or merge into one another via an active cutting corner -16-. The term "active" cutting corner -16- is used in the present case in order to characterize a cutting corner which connects a main lip -12- and the associated secondary lip -14- which are used simultaneously for material machining during operation of the respective cutting edge portion. The main lip -12- and the secondary lip -14- of an adjacent cutting edge portion that can be used independently are connected together via a passive cutting corner -18- or merge into one another via the latter.

Figure 2:
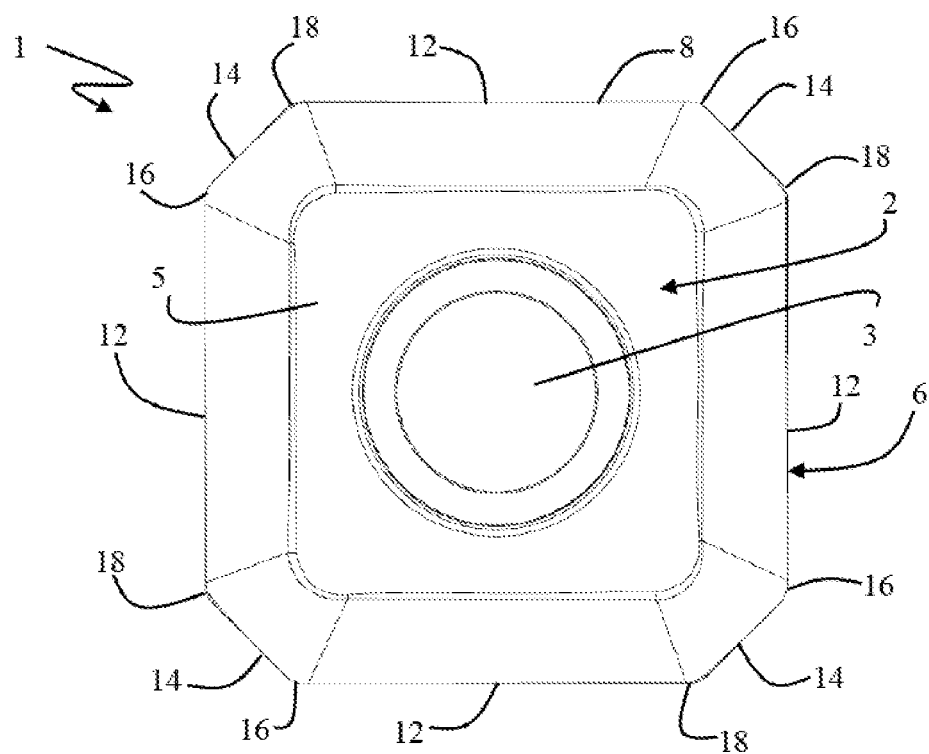
FIG. 2: shows a plan view of the cutting insert from FIG. 1 along an axis of symmetry.

The main lips -12- of the cutting edge portions of the first cutting edge -8- extend, when viewed in plan view along the axis of symmetry -S-, substantially along the contour of a square, as can be seen in particular in FIG. 2. The main lips -12- of the cutting edge portions of the second cutting edge -10- extend in the same way. The main lips -12- and the secondary lips -14- are arranged alternately along the respective cutting edge -8- or -10-. The secondary lips -14- extend, when viewed in plan view along the axis of symmetry -S-, at an obtuse angle, for example approximately at an angle of 135°, relative to the adjacent main lips -12-, as can be seen for example in FIG. 2. The secondary lips -14- are in this case much shorter than the main lips -12- and have a length of between ⅕ and ⅓ of the length of the main lips -12-.

Figure 3:
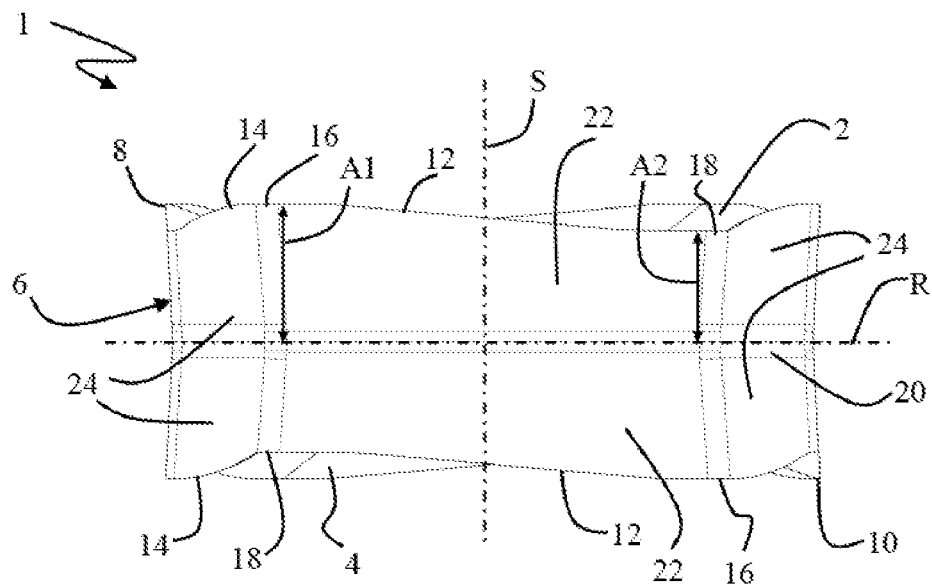
FIG. 3: shows a side view of the cutting insert in a direction perpendicular to the axis of symmetry and substantially perpendicular to the main lips.
Figure 4:
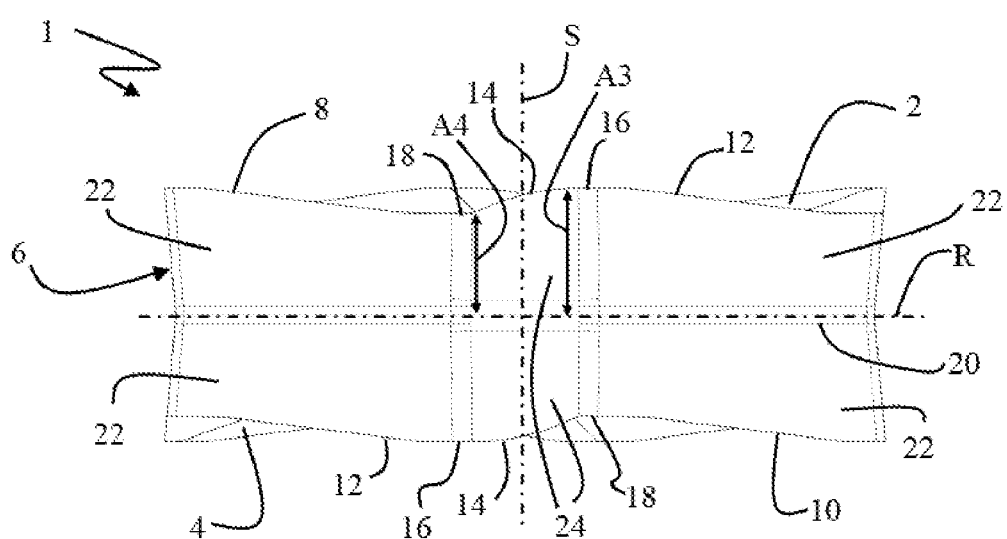
FIG. 4: shows a side view of the cutting insert in a direction perpendicular to the axis of symmetry and substantially perpendicular to the secondary lips.

As can be seen for example in FIG. 3 and FIG. 4, in each case one active cutting corner -16- of the first cutting edge -8- is arranged opposite a passive cutting corner -18- of the second cutting edge -10- with respect to the reference plane -R-. A passive cutting corner -18- of the first cutting edge -8- is arranged in each case opposite an active cutting corner -16- of the second cutting edge -10-.

Figure 1:
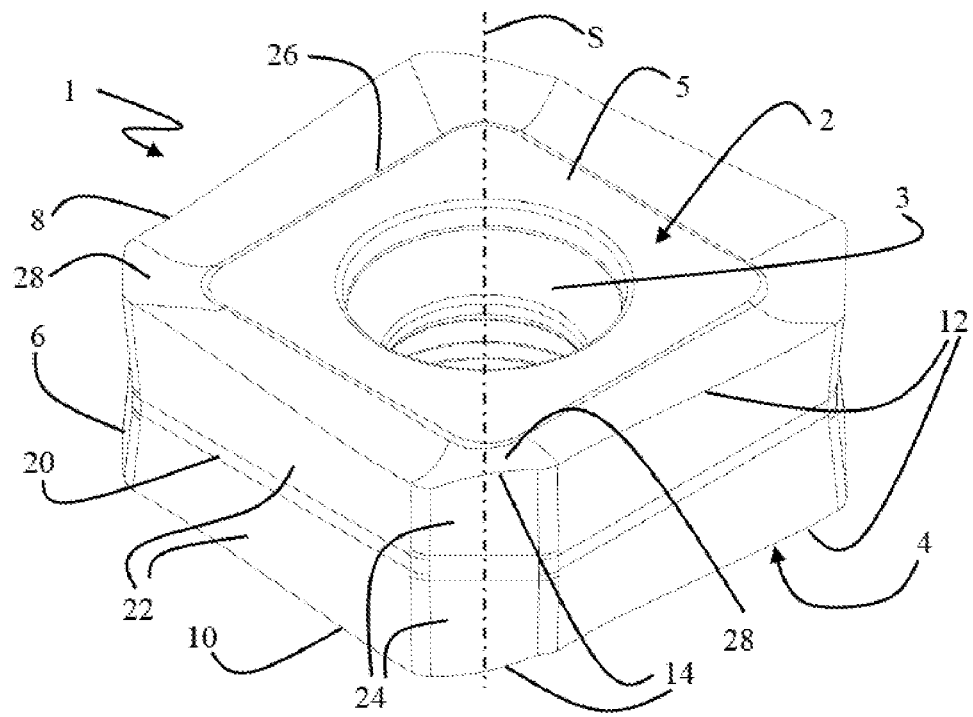
FIG. 1: shows a perspective view of a double-sided cutting insert according to one embodiment.

As can be seen in particular from FIG. 1 and FIG. 2, the main lips -12- of the first cutting edge -8- extend, when viewed in plan view along the axis of symmetry -S-, substantially parallel to the main lips -12- of the second cutting edge -10-.

As can be seen in particular from FIG. 1, FIG. 3 and FIG. 4, the cutting insert -1- has a constriction -20- which extends in the reference plane -R-. The constriction -20- is configured in a circumferential manner such that the side surface -6- is divided into an upper partial side surface and a lower partial side surface. The upper partial side surface and the lower partial side surface extend in this case such that in each case main flanks -22- and secondary flanks -24- are formed immediately adjacent to the first cutting edge -8- and the second cutting edge -10-. The main flanks -22- are formed in each case by planar surfaces in the embodiment. The secondary flanks -24- are likewise formed by planar surfaces in the embodiment.

The main flanks -22- extend such that they become closer to the axis of symmetry -S- with increasing distance from the associated main lip -12-, i.e. such that they extend in each case at a positive nominal main clearance angle. The secondary flanks -24- extend such that they become closer to the axis of symmetry -S- with increasing distance from the associated secondary lip -14-, i.e. such that they extend in each case at a positive nominal secondary clearance angle. As a whole, the double-sided cutting insert -1- is thus formed such that both the main flanks -22- and the secondary flanks -24- are each arranged at positive nominal clearance angles.

Figure 6:
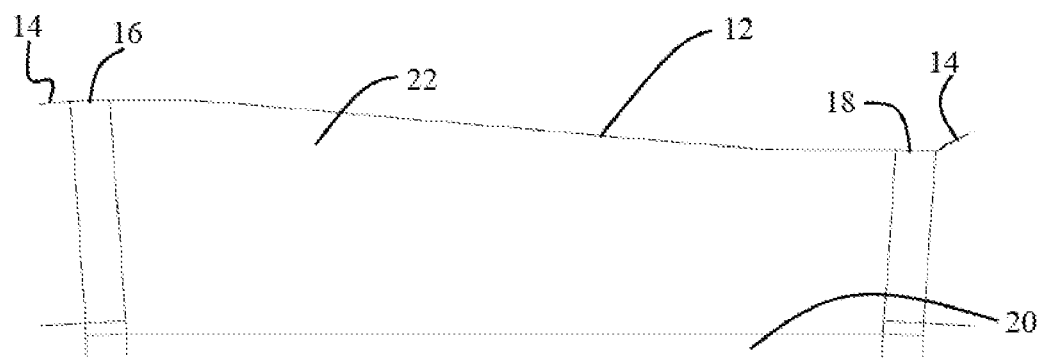
FIG. 6: shows a detail view of a main lip in a viewing direction perpendicular to a main flank.

The profile of the main lips -12- is described in more detail in the following text with reference to FIG. 3 and FIG. 6. FIG. 3 is a side view of the double-sided cutting insert -1-, viewed in a direction perpendicular to the axis of symmetry -S- and perpendicular to the constriction -20- in the region of the main flanks -22-. FIG. 6 is a detail view of a main lip -12-, viewed from a direction perpendicular to the associated main flank -22-. As can be seen in FIG. 3, in its region adjacent to the active cutting corner -16-, the main lip -12- is at a first distance -A1- from the reference plane -R-. In its profile from the active cutting corner -16- to the passive cutting corner -18-, the main lip -12- becomes closer to the reference plane -R- in a monotonously dropping manner. In its region adjacent to the passive cutting corner -18-, the main lip -12- is at a second distance -A2- from the reference plane -R-, said second distance -A2- being smaller than the first distance -A1-. As can be seen in FIG. 3, in this case the main lip -12- extends, starting from the active cutting corner -16-, initially in a relatively flat manner, drops more steeply in an intermediate region, and extends in a relatively flat manner again in the region adjacent to the passive cutting corner -18-.

Figure 5:
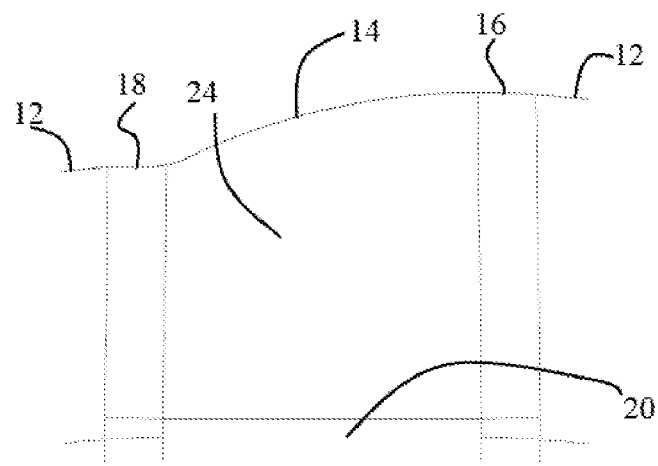
FIG. 5: shows a detail view of a secondary lip in a viewing direction perpendicular to a secondary flank.

The profile of the secondary lips -14- is described in more detail in the following text with reference to FIG. 4 and FIG. 5. FIG. 4 is a side view of the double-sided cutting insert -1-, when viewed in a direction perpendicular to the axis of symmetry -S- and perpendicular to the constriction -20- in the region of the secondary flanks -24-. FIG. 5 is a detail view of a secondary lip -14-, when viewed in a direction perpendicular to the associated secondary flanks -24-. As can be seen in particular in FIG. 5, the secondary lip -14- has, when viewed in a direction perpendicular to the secondary flanks -24-, a convex or outwardly curved profile. Although an embodiment is illustrated in which the secondary lip -14- is formed in a convex manner over its entire profile, it is for example also possible for the secondary lip -14- to be formed in a convex manner only regionally, in particular in a region adjacent to the active cutting corner -16-.

That end of the secondary lip -14- that is adjacent to the active cutting corner -16- is at a third distance -A3- from the reference plane -R- and the other end, remote from the active cutting corner -16-, of the secondary lip -14- is at a fourth distance -A4- from the reference plane -R-, wherein the third distance -A3- is greater than the fourth distance -A4-. Although an embodiment is shown in the figures in which the secondary lip -14- is at its greatest distance from the reference plane -R- close to its end adjacent to the active cutting corner -16-, other configurations are also possible in which the highest point of the secondary lip -14- is formed at another point, in particular closer to the center of the secondary lip -14-.

In the following text, the configuration of the top side -2- and of the underside -4- is described in more detail with reference to FIG. 1, FIG. 7 and FIG. 8a to FIG. 8c. The description of the chip-guiding structures is given in this case with reference to the top side -2-, wherein the underside -4- is configured in the same way and is not described separately. The top side -2- is provided with a chip-guiding structure which is described in more detail in the following text.

The chip-guiding structure has, adjoining the first cutting edge -8-, a rake face, the profile of which from the cutting edge -8- to a center of the cutting insert -1- becomes closer to the reference plane -R- with increasing distance from the cutting edge -8- and leads into a chip base -26-. The chip base -26- extends in this case circumferentially at a distance from the cutting edge -8- and forms in each case the minimum distance between the top side -2- and the reference plane -R- when proceeding from the cutting edge -8- in the direction of the axis of symmetry -S-. As can be seen in particular in FIG. 1, the rake face is formed in the region of the secondary lip -14- with secondary rake faces -28- which extend, starting from the convexly curved secondary lip -14-, into the chip base -26- in a convexly curved manner. The secondary rake faces -28- thus form curved regions which extend in an outwardly curved manner from the secondary lip -14- into the chip base -26-. The convex curvature is in this case given in a direction parallel to the secondary lip -14-.

The profile of the chip-guiding structure along the main lips -12- is described in more detail with reference to FIG. 8a to FIG. 8c. FIG. 8a is a sectional view corresponding to A-A in FIG. 7, FIG. 8b is a sectional view corresponding to B-B in FIG. 7 and FIG. 8c is a sectional view corresponding to C-C in FIG. 7. Along a main lip -12-, the rake face is provided with a main rake face -30- which extends from the main lip -12- into the chip base -26-. The chip base -26- is adjoined in the direction of the axis of symmetry -S- by a chip back -32- which becomes more remote from the reference plane -R- with increasing distance from the cutting edge -8-. Starting from the chip base -26-, the chip back -32- forms a rising region. In the direction of the axis of symmetry -S-, the chip back -32- passes over into the planar surface -5-.

As can be seen in particular in FIG. 8a to FIG. 8c, the height of the chip back -32- increases (measured in a direction perpendicular to the reference plane -R-) starting from the active cutting corner -16- along the main lip -12- in the direction of the passive cutting corner -18-. The height of the chip back -32- is very small in the section illustrated in FIG. 8a, that is to say close to the active cutting corner -16-. In the section illustrated in FIG. 8b, that is to say approximately in the center of the main lip -12-, the height of the chip back -26- is greater. In the section illustrated in FIG. 8c, that is to say close to the passive cutting corner -18-, the height of the chip back -26- is even greater. In other words, the distance from the respective lowest point of the chip base -26- to the planar surface -5- (measured in a direction perpendicular to the reference plane -R-) increases starting from the active cutting corner -16- along the main lip -12-. As can likewise be seen, the radius of the chip-guiding structure increases along the main lip -12- from the active cutting corner -16- in the direction of the passive cutting corner -18-. In other words, the width of that region of the chip-guiding structure that extends closer to the reference plane than the planar surface -5- increases, starting from the active cutting corner -16- along the main lip -12-, wherein the width should be measured in the direction from the main lip -12- to the axis of symmetry -S-.

Figure 9A:
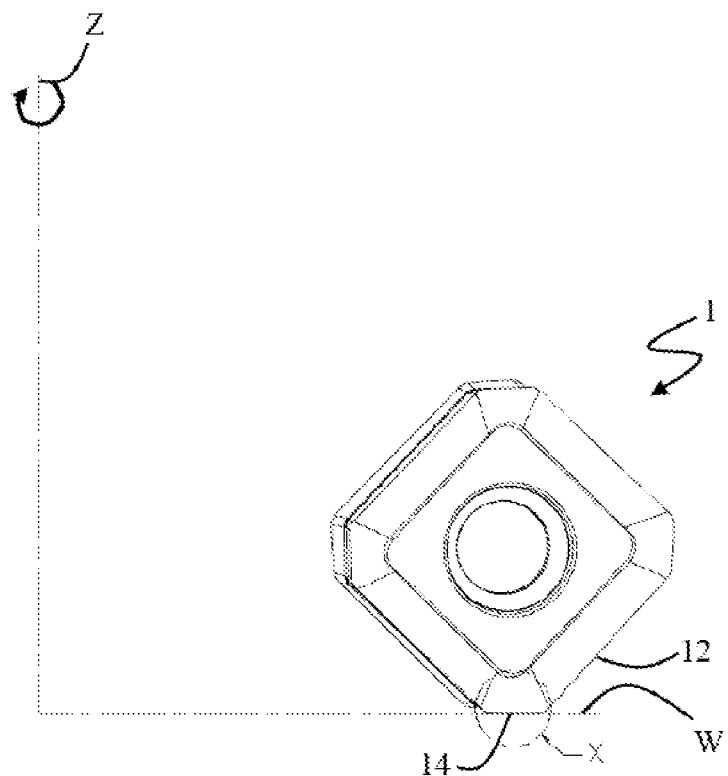
FIG. 9a: shows a schematic illustration of the arrangement of the double-sided cutting insert in a milling tool.
Figure 9B:
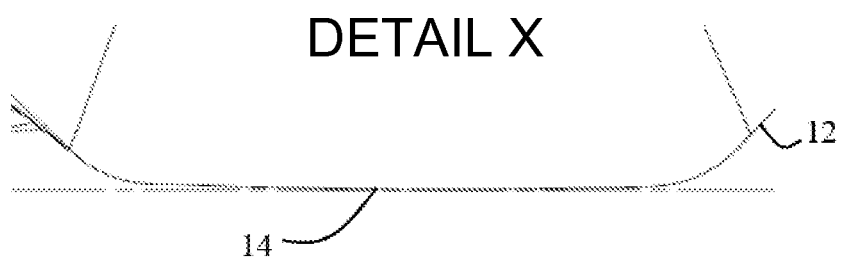

In the following text, the arrangement of the double-sided cutting insert -1- on a milling tool is additionally described with reference to FIG. 9a and FIG. 9b. In order to achieve perceptibility which is as good as possible of the orientation of the cutting insert -1-, only the cutting insert -1- is illustrated in FIG. 9a and the milling tool itself is not depicted. However, in FIG. 9a, a rotation axis -Z- is illustrated, about which the milling tool rotates during operation, as is illustrated schematically by an arrow. A plane -W- perpendicular to the rotation axis -R- is likewise schematically illustrated in FIG. 9a. FIG. 9b is a detail view of the detail X from FIG. 9a.

The cutting insert -1- is arranged in the milling tool such that the secondary lip -14- that comes into contact with the workpiece is oriented in a manner substantially perpendicular to the rotation axis -Z- and serves as a facing lip for the workpiece to be machined. The main lip -12- which is adjacent to the secondary lip -14- and is arranged radially on the outside with respect to the rotation axis -Z- forms the (machining) main lip that comes into contact with the workpiece to be machined. The cutting insert -1- is in this case tilted such that the secondary lip -14-, located behind the secondary lip -14- that comes into contact with the workpiece, as seen in the direction of rotation, of the other cutting edge is set back in the axial direction and thus does not become worn. Furthermore, the cutting insert -1- is additionally also tilted such that the main lip -12-, arranged behind the machining main lip -12-, as seen in the direction of rotation, of the other cutting edge is set back in the radial direction and thus does not become worn.

On account of the configuration of the secondary flank -24- and the main flank -22- in the described manner with positive nominal clearance angles, the tilting of the second cutting insert can be kept very small both with respect to the axial orientation and with respect to the radial orientation, this having an advantageous effect on the machining properties. On account of the configuration of the secondary lip -14- with the convex shaping, an advantageous surface quality of the workpiece to be machined is furthermore achieved, in which there is only minimal surface corrugation. The resulting slight curvature of the secondary lip -14- in the slightly tipped installation state, which achieves the advantageous surface quality, can be seen in particular in FIG. 9b.

Although one embodiment has been described very precisely, the invention is not limited to the realization described. In particular a preferred configuration of the cutting insert -1- as what is known as an S insert having four-fold indexability per cutting edge (n=4) was described. However, for example other configurations, for example with three-fold, five-fold, six-fold, etc. indexability per cutting edge, are also possible.

The invention claimed is:

1. A double-sided cutting insert for milling including face milling, the cutting insert comprising:
    a top side;
    an underside;
    a circumferential side surface defining a transition from said top side to said circumferential side surface and a transition from said underside to said circumferential side surface;
    a first cutting edge formed at said transition from said top side to said circumferential side surface;
    a second cutting edge formed at said transition from said underside to said circumferential side surface;
    an axis of symmetry with respect to which the cutting insert has n-fold rotational symmetry; and
    a reference plane extending perpendicularly to said axis of symmetry and dividing the cutting insert into two halves;
    said first cutting edge and said second cutting edge each having:
        active cutting corners, passive cutting corners and alternately disposed main lips and secondary lips each extending between a respective one of said active cutting corners and a respective one of said passive cutting corners;
        each of said main lips starting from a first distance from said reference plane at one of said active cutting corners and extending in a manner dropping monotonously to a smaller, second distance from said reference plane at a respective one of said passive cutting corners;
        each of said secondary lips having one end adjoining and another end remote from a respective one of said active cutting corners, said adjoining end disposed at a greater distance from said reference plane than said remote end; and
    said circumferential side surface having planar secondary flanks each being immediately adjacent a respective associated one of said secondary lips, and each of said secondary lips being at least regionally convexly formed in a plan view of said associated secondary flank.

2. The cutting insert according to claim 1, wherein said secondary flanks each become closer to said axis of symmetry with increasing distance from a respective one of said secondary lips.

3. The cutting insert according to claim 1 wherein said circumferential side surface has main flanks each being immediately adjacent a respective one of said main lips, and said main flanks each become closer to said axis of symmetry with increasing distance from a respective one of said main lips.

4. The cutting insert according to claim 1, wherein said top side and said underside have secondary rake faces each disposed adjacent a respective one of said secondary lips and extending in a convexly curved manner into a chip base.

5. The cutting insert according to claim 1, wherein said circumferential side surface is divided by a circumferential constriction into an upper partial side surface and a lower partial side surface.

6. The cutting insert according to claim 5, wherein said constriction extends in said reference plane.

7. The cutting insert according to claim 1, wherein:
    said top side and said underside have rake faces disposed adjacent said cutting edges, each becoming closer to said reference plane with increasing distance from a respective one of said cutting edges and leading into a chip base adjoined by a chip back becoming more remote from said reference plane with increasing distance from said cutting edge; and
    said chip back has a height increasing along a respective one of said main lips from said active cutting corner a direction toward said passive cutting corner (18).

8. The cutting insert according to claim 1, wherein said top side and said underside each have a respective chip-guiding structure with a rake face, a chip base and a chip back, and said chip-guiding structure has a radius increasing along said main lip from said active cutting corner in a direction toward said passive cutting corner.

9. The cutting insert according to claim 1, wherein said first cutting edge and said second cutting edge each have four main lips and four secondary lips, said main lips including adjacent main lips each disposed substantially at right angles to one another and said secondary lips each extend at an obtuse angle to said adjacent main lips.

10. The cutting insert according to claim 1, wherein:
    said active cutting corners of said first cutting edge are each formed opposite a respective one of said passive cutting corners of said second cutting edge relative to said reference plane; and
    said passive cutting corners of said first cutting edge are each formed opposite a respective one of said active cutting corners of said second cutting edge relative to said reference plane.

11. The cutting insert according to claim 1, wherein a length of said secondary lips is between ⅙ and ½ of a length of said main lips.

12. A milling tool, comprising:
    at least one cutting insert according to claim 1; and
    a rotation axis;

said cutting insert fastened to the milling tool with a secondary lip oriented substantially perpendicular to said rotation axis.

\* \* \* \* \*